United States Patent [19]

Tang et al.

[11] Patent Number: 5,572,449
[45] Date of Patent: Nov. 5, 1996

[54] AUTOMATIC VEHICLE FOLLOWING SYSTEM

[75] Inventors: Qing Tang; Wei-Ping Wang; Zhongxue Gan; Ruiming Zhang, all of Storrs, Conn.; John Moh, Freshmeadows, N.Y.

[73] Assignee: VI&T Group, Inc., Freshmeadows, N.Y.

[21] Appl. No.: 245,865

[22] Filed: May 19, 1994

[51] Int. Cl.$^6$ .................................................. B60T 7/16
[52] U.S. Cl. .............. 364/565; 364/426.01; 364/424.01; 364/426.04; 180/271; 180/170; 340/903
[58] Field of Search ................... 364/424.01, 449, 364/426.01, 565, 566, 461, 426.04, 468, 424.05; 340/990, 992, 903, 904; 342/455; 123/349, 350

[56] References Cited

U.S. PATENT DOCUMENTS

| | | | |
|---|---|---|---|
| 3,952,301 | 4/1976 | Sorkin | 343/7 VM |
| 4,361,202 | 11/1982 | Minovitch | 180/168 |
| 4,621,705 | 11/1986 | Etoh | 180/169 |
| 4,622,636 | 11/1986 | Tachibana | 364/424 |
| 4,628,317 | 12/1986 | Nishikawa et al. | 340/903 |
| 4,703,429 | 10/1987 | Sakata | 364/426 |
| 4,706,195 | 11/1987 | Yoshino et al. | 364/426 |
| 4,791,570 | 12/1988 | Sherman et al. | 364/436 |
| 4,855,822 | 8/1989 | Narendra et al. | 358/103 |
| 4,893,240 | 1/1990 | Karkouti | 364/424.05 |
| 4,962,457 | 10/1990 | Chen et al. | 364/443 |

(List continued on next page.)

OTHER PUBLICATIONS

Shladover et al., "Automatic Vehicle Control Developments in the PATH Program", IEEE, pp. 114–129, 1991.
"Automated Highway Studies at The Ohio State University—An Overview", IEEE Transactions On Vehicular Technology, vol. 40, No. 1, Feb. 1991, pp. 100–113.
"An Overview of Systems Studies of Automated Highway Systems", IEEE Transactions On Vehicular Technology, vol. 40, No. 1, Feb. 1991, pp. 82–99.
"Smart Cars on Smart Roads: Problems of Control", IEEE Transactions on Automatic Control, vol. 38, No. 2, Feb. 1993, pp. 195–207.
"Automatic Vehicle Control Developments in the Path Program", IEEE Transactions On Vehicular Technology, vol. 40, No. 1, Feb. 1991, pp. 114–129.
"Visual Control of an Autonomous Vehicle (BART)—The Vehicle–Following Problem", IEEE Transactions On Vehicular Technology, vol. 40, No. 3, Aug. 1991, pp. 654–662.

Primary Examiner—Kevin J. Teska
Assistant Examiner—Thai Phan
Attorney, Agent, or Firm—McCormick, Paulding & Huber

[57] ABSTRACT

An automatic vehicle following system is provided for controlling a following vehicle to maintain at least a predetermined distance behind a preceding vehicle and to substantially follow the path of the preceding vehicle. An on-line measurement system of the preceding vehicle generates signals indicative of the velocity (having speed and directional components) of the preceding vehicle, and a communication system transmits the velocity signals to the following vehicle. The following vehicle likewise has a communication system for receiving the signals from the preceding vehicle, and an on-line measurement system for providing signals indicative of the velocity of the following vehicle and signals indicative of the distance between the two vehicles. A signal processing system of the following vehicle is coupled to the communication system and on-line measurement system for estimating motion trajectory of the preceding vehicle based on the difference in the velocities of the preceding and following vehicles and the following distance. A control system generates control signals and takes action so as to perform speed control and maintain at least a predetermined safe following distance between the two vehicles, and steering control to substantially follow the path of the preceding vehicle.

26 Claims, 2 Drawing Sheets

U.S. PATENT DOCUMENTS

| | | | |
|---|---|---|---|
| 5,039,217 | 8/1991 | Maekawa et al. | 364/424.01 |
| 5,053,964 | 10/1991 | Mister et al. | 364/424.01 |
| 5,053,979 | 10/1991 | Etoh | 364/565 |
| 5,058,024 | 10/1991 | Inselberg | 364/461 |
| 5,101,198 | 3/1992 | Abou et al. | 340/825.5 |
| 5,122,961 | 6/1992 | Toyama et al. | 364/424.01 |
| 5,124,923 | 6/1992 | Takahashi | 364/424.01 |
| 5,126,735 | 6/1992 | Trevijano | 340/902 |
| 5,159,480 | 10/1992 | Gordon et al. | 359/181 |
| 5,173,859 | 12/1992 | Deering | 364/424.01 |
| 5,222,024 | 6/1993 | Orita et al. | 364/468 |
| 5,223,844 | 6/1993 | Mansell et al. | 342/357 |
| 5,234,071 | 8/1993 | Kajiwara | 180/169 |
| 5,285,523 | 2/1994 | Takahashi | 364/424.01 |
| 5,311,431 | 5/1994 | Cao et al. | 364/424.05 |
| 5,331,561 | 7/1994 | Barrett et al. | 364/424.01 |
| 5,337,236 | 8/1994 | Fogg et al. | 364/424.04 |
| 5,369,591 | 11/1994 | Broxmeyer | 364/461 |

AUTOMATIC VEHICLE FOLLOWING SYSTEM

FIELD OF THE INVENTION

The present invention relates to vehicle control systems, and more particularly, to automatic vehicle following systems enabling vehicles to follow other vehicles at safe distances.

BACKGROUND INFORMATION

During the 1980s, transportation planners and researchers emphasized the need for new technologies for solving the rapidly worsening problems of road transportation systems. This emphasis led to various research and development activities for new systems in the public sector, the automotive industry, and academia, which have generally been referred to as Intelligent Vehicle-Highway Systems (IVHS). J. G. Bender, "An overview of system studies of automated highway systems", *IEEE Transactions on Vehicular Technology*, Vol. 40, pp. 82–99 (1991).

One of the functional areas of research within the IVHS programs has been directed to Advanced Vehicle Control Systems (AVCS). AVCS represents a broad grouping of technologies and potential products, including concepts for systems that would take complete control of the movement of a vehicle, systems that would assist a driver in controlling a vehicle, and systems that would provide "high-bandwidth" information to a driver, particularly about imminent hazards. Automatic vehicle following systems, which would enable vehicles to automatically follow other vehicles at safe distances, have also been identified as an area of research in critical need for the development of practical and effective solutions.

Vehicle following, i.e., following another vehicle at a safe distance, is one of the most frequent driver tasks, and one which often causes driver fatigue and dozing. Driver fatigue in turn causes delays and errors in braking, passing, negotiating obstacles or curves, or recognizing signs and signals, resulting in an unavoidable toll of accidents and congestion. Indeed, it is believed that over 90% of traffic accidents are caused by such human errors. If driver and/or vehicle reaction time could be decreased by only 1 second, it is believed that over 80% of such accidents could be eliminated.

With increasing traffic volume, the traffic density increases, and the distance between vehicles correspondingly decreases, thus making vehicle following a more intense driving task. Vehicle following will therefore become an increasingly important focus for vehicle automation in order to reduce related traffic problems and accidents and increase efficiency. Accordingly, automatic vehicle following is believed to be a necessary function of any vehicle control system for successful transportation automation.

Previous research related to vehicle following technology varies in method and aspect, but generally falls within three categories: (1) fully autonomous systems based on vision, I. Masakii, *Vision-Based Vehicle Guidance*, New York, Springer-Verlag (1992); (2) systems based on roadway reference, Kehtarnavaz et al., "Visual control autonomous vehicle (BART)—vehicle following problem", *IEEE Transactions on Vehicular Technology*, Vol. 40, pp. 654–662 (1991); and (3) systems based on roadway guidance and central control, Shladover et al., "Automatic vehicle control developments in the PATH program", *IEEE Transactions On Automatic Control*, Vol. 40, No. 1, pp. 306–315 (1991).

In one vision-based system, a pair of stereo cameras were mounted on the front of a vehicle to measure the distance from a preceding vehicle, and to measure the heading angle of the preceding vehicle relative to the following vehicle. One advantage of this type of system is that it functions independently of either a central transportation system or a roadway guidance system. However, such a system is reliable only at relatively slow speeds. Also with this system the vehicle is controlled by following the preceding vehicle itself, as opposed to the path of the preceding vehicle, and therefore the following vehicle typically must remain sufficiently close to the preceding vehicle for the system to work reliably. Another drawback with the vision-based system is that it is sensitive to illumination conditions.

The systems based on roadway references, such as lines or marks on the road to guide the vehicle, are less complicated in terms of vehicle control in comparison to other systems. These types of systems control the vehicle to follow the roadway references, as opposed to the preceding vehicle or path of the preceding vehicle. The reliability of these systems are thus dependent on both environmental conditions and the condition of the roadway references. For example, construction on the roadway, or poor weather conditions, such as rain, snow or fog, can prevent the system from recognizing the lanes or other necessary references on the roadway.

In the central control systems, a following vehicle receives path information about a preceding vehicle from a central transportation control system. However, it is believed that the technology necessary for these types of systems will not be available in the near future.

Accordingly, it is an object of the present invention to overcome the drawbacks and disadvantages of other proposed vehicle following systems, and to provide such a system that enables vehicles to automatically follow each other at safe distances under various speed, roadway and weather conditions.

SUMMARY OF THE INVENTION

The present invention is directed to an automatic vehicle following system for controlling a following vehicle to maintain at least a predetermined distance behind a preceding vehicle and substantially follow the path of the preceding vehicle. The preceding vehicle includes an on-line measurement system for acquiring data indicative of the velocity of the preceding vehicle (having speed and directional components), and a communication system for transmitting signals to the following vehicle. The following vehicle likewise includes a communication system for receiving signals from the preceding vehicle, and an on-line measurement system for providing data indicative of the velocity of the following vehicle and data indicative of the distance between the two vehicles (the following distance). A signal processing system of the following vehicle is coupled to the communication system and the on-line measurement system for data conditioning and fusion, vehicle state estimation, and trajectory prediction. The following vehicle also includes a control system which performs longitudinal control (speed) and maintains at least a predetermined distance between the two vehicles, and lateral control (steering) to substantially follow the path of the preceding vehicle.

In one embodiment of the present invention, the control system receives information from the signal processing system to control the speed of the following vehicle by adjusting its throttle and/or brake positions. The controller also preferably controls the steering of the following vehicle based on the directional components of the velocity signals. The control system includes both feed-forward and feedback loops.

One advantage of the present invention is that the system automatically controls the distance between the preceding and following vehicles, preferably based on the absolute velocities of the two vehicles and the following distance, which can be rapidly and accurately measured with known on-board sensors, thus rendering the system particularly reliable.

Other advantages of the automatic vehicle following system of the present invention will become apparent in view of the following detailed description and accompanying drawings.

DETAILED DESCRIPTION OF THE PREFERRED EMBODIMENT

Figure 1:
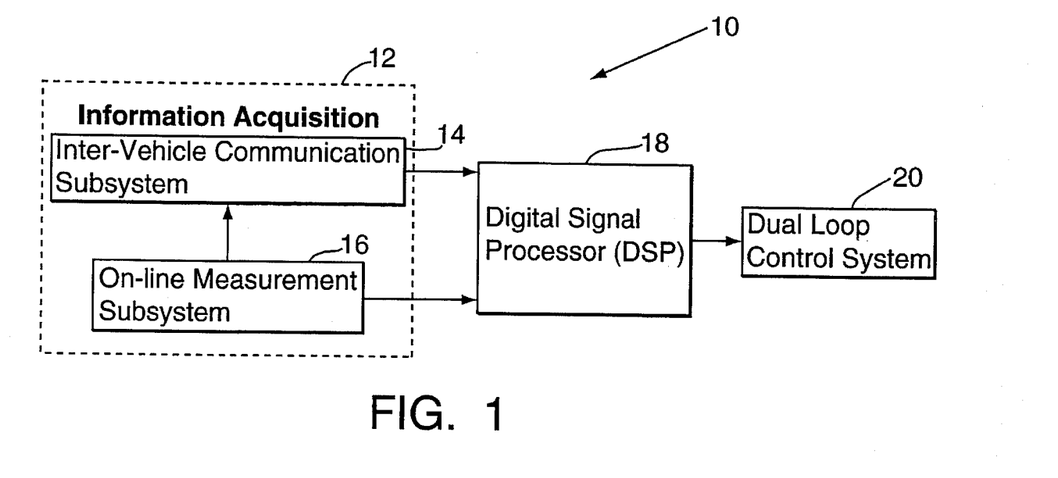
FIG. 1 is a block diagram of an automatic vehicle following system embodying the present invention.

In FIG. 1, an automatic vehicle following system embodying the present invention is indicated generally by the reference numeral 10. Each system 10 is mounted within a respective vehicle (not shown) and comprises an information acquisition system 12, including an inter-vehicle communication subsystem 14 and an on-line measurement subsystem 16. Each measurement system 16 gathers status information pertaining to the respective vehicle itself and actively detects the relative distance and speed of a preceding vehicle. The inter-vehicle communication system 14 of a preceding vehicle transmits status information from the preceding vehicle to the inter-vehicle communication system 14 of a following vehicle, such as the velocity vector of the preceding vehicle. As is described further below, each velocity vector includes two components, a speed component (e.g., m/s) and a directional component (e.g., radians).

Each vehicle following system 10 also comprises a signal processing system 18 coupled to the respective inter-vehicle communication system 14 and on-line measurement system 16, and a dual loop control system 20. The signal processing system 18 processes the data transmitted by the respective measurement and communication systems to filter out environmental interference and noise, estimate vehicle motion status, predict the motion trajectory of the preceding vehicle, and diagnose system failures. Output data from the signal processing system 18 is transmitted to the respective control system 20 to generate control signals and effectively control the speed (longitudinal control), and steering (lateral control) of the following vehicle based on velocity vector data from both the preceding and following vehicles and the following distance. The longitudinal control adjusts the speed of the following vehicle in response to corresponding changes in the speed component of the velocity vector of the preceding vehicle, and the lateral control likewise adjusts the steering of the following vehicle in response to corresponding changes in the directional component of the velocity vector of the preceding vehicle, in order to substantially track the driving path (motion trajectory) of the preceding vehicle and follow the road geometry, as is described further below.

One advantage of the system of the present invention, is that the following vehicle is controlled based on the difference in the velocities (having both speed and directional components) of the two vehicles, as opposed to measured positions of the vehicles relative to each other (or a measured distance between the two vehicles). This in turn leads to faster response, and better dynamic performance of the control system, enabling the vehicle following system to operate reliably at relatively high vehicle speeds. Another advantage of the present invention is that the absolute velocities of the vehicles can be detected by on-board sensors, permitting the following system of the present invention to be vehicle-borne and self-contained, as is described further below.

Figure 2:
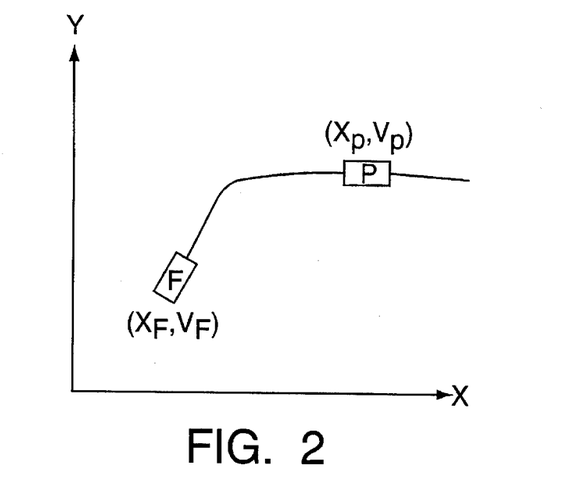
FIG. 2 is a schematic diagram of a vehicle following model for designing and implementing the system of FIG. 1.

With reference to FIG. 2, when a vehicle travels on a roadway its motion can be described by two vectors, a position vector "x" and a velocity vector "v". As shown schematically in FIG. 2, the preceding vehicle is designated "P" and the following vehicle is designated "F". The vector pair ($x_p$, $v_p$) thus denotes the position and velocity of the preceding vehicle, and the vector pair ($x_f$, $v_f$) denotes the position and velocity of the following vehicle.

In accordance with the present invention, the automatic vehicle following system preferably controls the following vehicle F to track the velocity vectors of the preceding vehicle P, and thus follow substantially the same motion trajectory (or driving path) as the preceding vehicle. If it is assumed that the distance between the two vehicles (or following distance) is d, and it takes time T to travel that distance (the following time, i.e., $T=d/v_f(t)$), then the position vector $x_f$ of the following vehicle at time t will be equal to the position vector $x_p$ of the preceding vehicle at time t–T, i.e.:

$$x_p(t-T)=x_f(t) \qquad (1)$$

For each vehicle F and P, the position and velocity vectors have the following integration relationship:

$$x_p(t-T) = x_p|_{t=t0} + \int_{t0}^{t-T} v_p(u)du \qquad (2)$$

$$x_f(t) = x_f|_{t=T+t0} + \int_{T+t0}^{t} v_f(u)du \qquad (3)$$

If the following vehicle F follows the same motion trajectory as the preceding vehicle P, then at time t, Eq. 2 should equal Eq. 3. Also, if the following vehicle is exactly tracking the preceding vehicle at the beginning, i.e., at time $t=t_0$, then the following condition will be satisfied:

$$x_p|_{t=t0}=x_f|_{t=T} \qquad (4)$$

For this ideal following condition to continue throughout the time period T, Eq. (5) must also be satisfied:

$$\int_{T+t0}^{t} [v_p(u-T) - v_f(u)]du = 0 \qquad (5)$$

The integration of Eq. (5) yields the following result:

$$V_P(t-T) = V_f(t) \tag{6}$$

This derivation therefore shows that if two vehicles start sequentially from the same location, and the preceding vehicle P starts $T-t_0$ seconds earlier then the following vehicle F, in order for the following vehicle to have the same motion trajectory as the preceding vehicle, the following vehicle should have a velocity at time $t-t_0$ equal to the velocity of the preceding vehicle at time $t-(T-t_0)$.

The following vehicle cannot track the velocity vectors of the preceding vehicle exactly, however, and therefore the requirement of Eq. (6) is preferably relaxed as follows:

$$J = {}_{t_0}\!\int^t [Y_P(t-T)-Y_F(t)]^{Tr} Q[Y_P(t-T)-Y_F(t)]dt \leq \beta \tag{7}$$

wherein $\beta$ is a predetermined, relatively small positive constant, T, as described above, is approximately equal to $d/v_f(t)$; $Y_p$ is the state vector of the preceding vehicle; and $Y_F$ is the state vector of the following vehicle. Each state vector is a combination of the respective position and velocity vectors. Tr indicates vector transpose, and Q is a matrix indicating whether the position or the velocity component is more important for control. The velocity vectors are measured with on-board sensors, as described further below, and the position vectors are derived by integrating the respective velocity vectors in accordance with Eqs. (2) or (3) above. J is referred to as a quadratic performance index, and is indicative of the total deviations in the position and velocity of both vehicles. The automatic following system of the present invention preferably controls the velocity $v_f$ of the following vehicle (both speed and directional components) so that both velocities ($v_f$ and $v_p$) satisfy Eq. (7) and the following vehicle substantially tracks the path of the preceding vehicle, as is described further below.

Turning again to FIG. 1, the on-line measurement system 16 obtains information about both the preceding and following vehicles, and transmits the measured information to the signal processing system 18. In order to function at relatively high speeds, such as during highway driving ($\geq 55$ mph), the measurement data must be accurate, and must be generated in a timely fashion in order to control the following vehicle F in response thereto. Each measurement should be made available within no more than a few hundredths of a second, and accuracy should be within 1 percent. The measurement system 16 must also be functional under various environmental conditions, such as in fog, rain, or travel over rough surfaces.

In order to control the vehicles effectively, three types of measurements should be made: (1) relative variables, which determine the relative velocities and positions of the vehicles; (2) motion variables, which indicate the state of motion of each vehicle with respect to a reference, such as a road surface; and (3) internal variables which affect vehicle motion dynamics.

In a preferred embodiment of the invention, the relative variables include (a) the following distance, which is the measured distance between the preceding and the following vehicle, and (b) the relative speed of the preceding vehicle with respect to the following vehicle. The motion variables include (c) the speed component of each velocity vector ($v_p$ and $v_f$), and (d) the directional component of each velocity vector (or heading angle). And the internal variables include (e) the throttle angle of each vehicle, (f) the brake pressure of each vehicle, and (g) the steering angle of each vehicle.

Based on the measured velocity vectors $v_f$ and $v_p$, the signal processing system 18 determines corresponding acceleration vectors, $a_f$ and $a_p$, in a known manner, such as by derivation. The acceleration vectors may be utilized to provide control lead time, and to enhance control performance. The signal processing system 18 also determines both the speed component and the direction component of each velocity vector in order to accurately track the motion trajectory of the other vehicle.

Based on the throttle angle and brake pressure measurements, the signal processing system 18 can determine potential motion changes and predict upcoming motion states of the respective vehicle. The steering angle measurements, on the other hand, provide an indication of upcoming changes in direction of the preceding vehicle, and can be used for feed-forward control.

Figure 3:
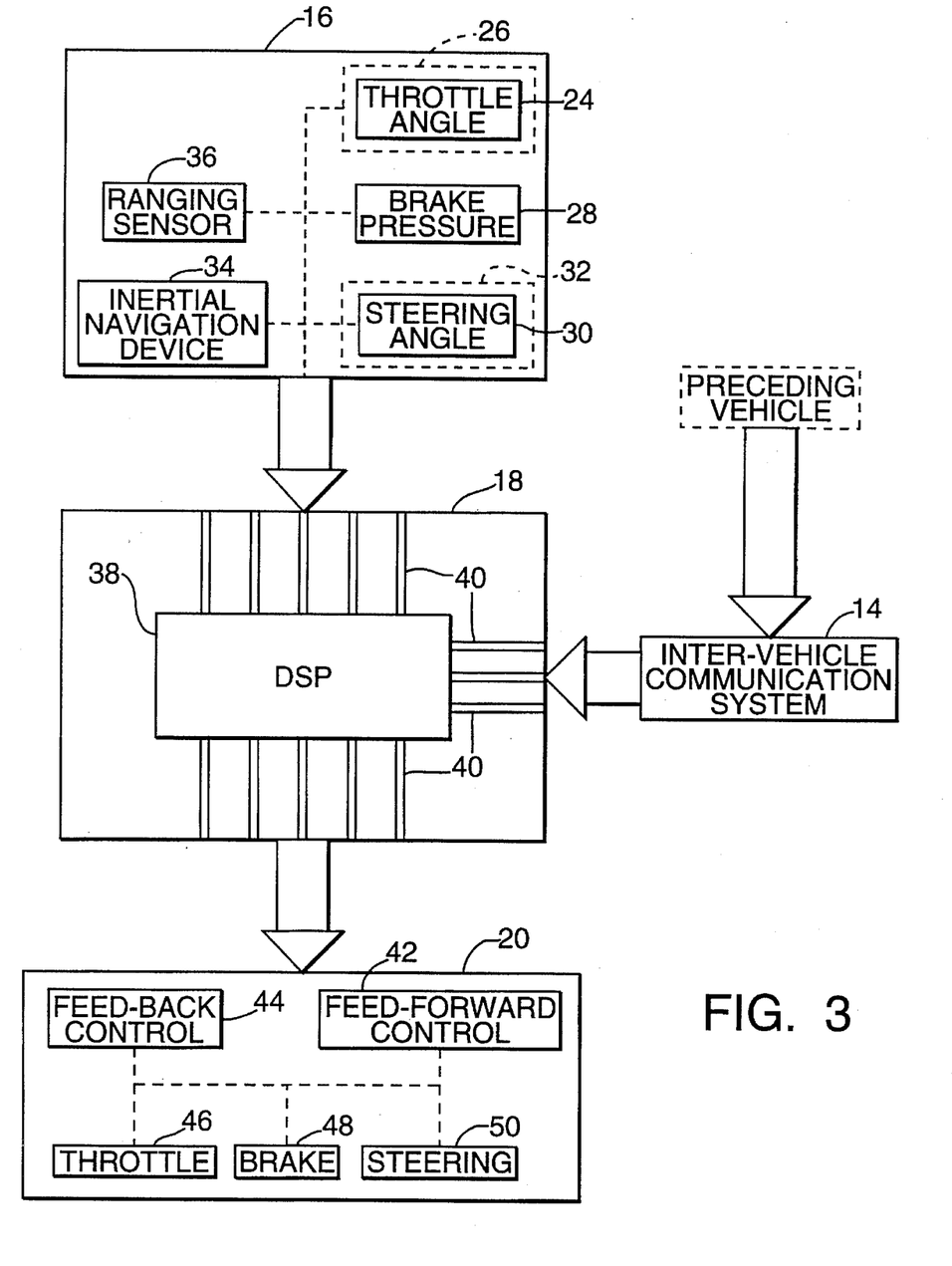
FIG. 3 is a block diagram illustrating the components of the on-line measurement, signal processing, inter-vehicle communication, and control systems of the vehicle following system of FIG. 1.

Known on-board sensors are utilized to measure each variable, and if possible, existing vehicle sensors are employed. With reference to FIG. 3, throttle angle data is tapped from a sensor 24 of an existing cruise control system 26. Brake pressure data is tapped from a known pressure sensor 28, such as a hydraulic pressure sensor, used widely in industry for hydraulic pressure measurements. And the steering angle data is tapped from a known sensor 30 coupled to the vehicle steering system 32.

Each vehicle also includes a known type of inertial navigation device 34 for measuring the velocity vectors ($v_p$ or $v_f$) of the vehicle, wherein each velocity vector includes a speed component and a directional component (or heading angle). A typical such inertial navigation device includes a navigation microprocessor, and several inertial sensors, typically gyroscopes and accelerometers. Once aligned with a set of reference axes (such as the "North/East" setting of a compass), the sensors measure both components of the velocity vectors of the vehicle, i.e., speed and direction, with respect to the reference axes. Preferably optical gyroscopes and accelerometers are employed as the inertial sensors, since they have no g-sensitivity, are capable of measuring at relatively high rates without a corresponding increase in power, have good drift stability, and have a relatively stable, linear scale factor. The optical sensors are also typically less expensive and smaller than other types of inertial sensors. One advantage of employing the inertial navigation device is that the velocity vector data is absolute, i.e., is measured with respect to a respective longitude of the earth.

A ranging sensor 36 is also preferably mounted on each vehicle to measure the relative variables (the following distance and relative speed of the preceding vehicle). The following distance data d is transmitted to the processor 18, which in turn calculates the following time T ($T=d/v_f(t)$) for purposes of calculating Eq. (7), as is described further below. At highway speeds (e.g., $\geq 55$ mph) the emergency braking distance is at least approximately 180 feet, and therefore the ranging sensor should have a detection range of at least approximately 180 feet, an accuracy of approximately 1 percent, a sampling rate of at least 200 Hz, and an ability to operate reliably under extreme weather conditions. In order to satisfy these requirements, preferably a known radar-based measurement device is employed, such as a microwave radar device, an ultrasonic radar device, or an optical radar device, depending upon the level of measurement accuracy required. Each of these types of devices includes a transmitter for transmitting predetermined wave forms, typically in a series of narrow pulses, and a receiver for receiving the waves reflected off the preceding vehicle.

The ranging sensor 36 and the communication system 14 provide overlapping information about the motion states of both vehicles, e.g. vehicle speed. This information redundancy is used to perform fault diagnosis, and accommodation. The signal processing system 18 of the following vehicle compares the speed components of the velocity vector data transmitted by the preceding vehicle to the corresponding speed data transmitted by its own ranging sensor in order to ensure that the velocity vector data is accurate. If the velocity vector data from the preceding inertial navigation device does not fall within a predetermined tolerance range of the speed data measured by the ranging sensor, the signal processing system 18 transmits an alarm signal to the driver to switch to manual control.

The inter-vehicle communication system 14 is coupled to the respective on-line measurement system 16 and transmits requisite data from the preceding vehicle P to the following vehicle F primarily indicative of the status of the preceding vehicle. Preferably, each vehicle communication system 14 continuously transmits the following data: vehicle velocity and acceleration vectors ($v_f$ or $v_p$, $a_f$ or $a_p$), throttle angle, brake pressure, steering angle, and emergency signals (if applicable).

In a preferred embodiment of the invention, the communication system 14 digitizes the data, if necessary, and transmits the data at a rate of at least about 30 kb/s. A reasonable following distance at highway speeds is within the range of approximately 30 to 300 ft., and therefore the range of the communication system 14 should be at least 300 ft. In order to satisfy these requirements, a line-of-sight, short-range communication system, such as a microwave radio and infrared link, is preferably employed. This type of system utilizes a relatively high frequency and a relatively high bandwidth. One advantage of this type of device, is that the size of the components can be reduced in comparison to other types of communication devices.

As also shown in FIG. 3, the signal processing system 18 includes a digital signal processor (DSP) 38 and a plurality of input/output (I/O) devices 40 coupled between the DSP and the information acquisition system 12, and the control system 20. The I/O devices 40 (performing pre-amplification, ADC, DAC, etc.) appropriately transmit the data for processing by the DSP 38. All data is preferably digitized for processing, and the I/O devices are capable of relatively high speed data acquisition and transmission, e.g., at least 40 data samples per second for each channel.

The primary functions of the signal processing system 18 are state estimation and trajectory prediction (i.e., predicting the motion trajectory or driving path of the preceding vehicle), and fault diagnosis. The communication system 14 continuously transmits the motion variable and internal variable data from the preceding vehicle (i.e., velocity vector ($v_p$), throttle angle, brake pressure, and steering angle data) to the DSP 38 of the following vehicle. The measurement system 16 of the following vehicle also continuously transmits the motion variable and internal variable data from the following vehicle itself (i.e., velocity vector ($v_f$), throttle angle, brake pressure, and steering angle data), and in addition transmits the relative variable data from the following vehicle (i.e., following distance and relative speed of the preceding vehicle) to the DSP 38 of the following vehicle.

The DSP 38 employs a Kalman filter in a manner known to those of ordinary skill in the pertinent art to filter out signal noise and recursively estimate the motion trajectory of the preceding vehicle based on the transmitted data. The DSP transmits the motion trajectory data to the control system 20, and the control system in turn generates speed (longitudinal) control signals and steering (lateral) control signals so that the following vehicle maintains a safe following distance and substantially tracks the motion trajectory of the preceding vehicle. Each speed and steering control signal is calculated based on a predetermined state vector $Y_F$ (and thus velocity vector $v_f$) necessary to satisfy the requirements of Eq. (7) above, in order to control operation of the following vehicle so as to follow a predetermined heading angle and substantially maintain a predetermined safe following distance d.

Based on the relative variable data (i.e., the following distance and the relative speed of the preceding vehicle) as measured by the ranging sensor 36 of the following vehicle, the DSP 38 of the following vehicle also performs on-line fault diagnosis by comparing this measured data to the corresponding data transmitted over the communication system 14 from the preceding vehicle. If the data transmitted by the preceding vehicle falls outside of a predetermined tolerance range, the processor transmits a warning signal to the driver so that the driver can switch to complete manual control.

The control system 20 is a dual loop system comprising a feed-back control loop 44 and a feed-forward control loop 42. The feed-back control loop is based on the motion variable data from both vehicles, including the velocities and relative distance between the two vehicles. The feed-forward control loop is based on the internal variable data transmitted from the preceding vehicle and the motion trajectory estimation computed by the DSP 38 (employing the Kalman filter). The control algorithm is designed to meet the performance requirement of Eq. (7). The control system 20 includes a throttle (or fuel injection) actuator 46 to control the speed and acceleration of the respective vehicle (longitudinal control), a brake actuator 48 to control the brake system of the vehicle (longitudinal control), and a steering actuator 50 to control vehicle steering (lateral control). Each actuator is preferably a servo-controller for controlling vehicle speed and acceleration, braking and steering, respectively, in a manner known to those of ordinary skill in the pertinent art. The actuators are adjusted in a known manner so as not to exceed the physical capabilities of the respective vehicle. Typically, acceleration is limited to about 0.2 to 0.3 g, and deceleration is limited to about 0.5 g, permitting considerable variation depending upon traction conditions. The control system also has a fairly fast dynamic behavior in order to control the vehicle under high speeds (e.g., $\geq 55$ m.p.h.) and to react in emergency situations within a fraction of a second. Under normal operating conditions, peak acceleration and deceleration should be less than approximately 2 m/s$^2$, and vehicle jerks should be less than approximately 3 m/s$^2$, in order to maintain a comfortable ride.

Based on the signals transmitted by the signal processing system 18, the control system adjusts the throttle, brake and steering actuators so as to maintain the vector relationship defined by Eq. (7) above, and in turn maintain a substantially safe following distance and substantially track the motion trajectory (or driving path) of the preceding vehicle.

In the operation of the automatic following system 10, the inter-vehicle communication system 14 continuously transmits the motion variable data and internal variable data from the preceding vehicle P to the communication system 14 and in turn DSP 38 of the following vehicle F. The motion variable data from the preceding vehicle includes the velocity vector data (both speed and directional components of $v_p$), and the internal variable data includes the throttle angle, brake pressure, and steering angle of the preceding vehicle. The on-line measurement system 16 of the following vehicle likewise continuously transmits motion variable data and internal variable data from the following vehicle itself, in addition to the relative variable data (i.e., the following distance and relative speed as measured by the respective ranging sensor 36) to the DSP 38 of the following vehicle.

The DSP 38 conditions the data and generates motion trajectory data, and transmits the data to the control system 20. The control system generates the speed and steering control signals so that the vector relationships follow Eq. (7), and thus controls the operation of the following vehicle to substantially track the motion trajectory of the preceding vehicle at a safe following distance.

The DSP 38 also performs fault diagnosis by continuously comparing the relative speed data as measured by the ranging sensor 36 of the following vehicle to the corresponding speed components of the velocity vector data from the preceding vehicle, and by comparing the steering angle data to the corresponding directional components of the velocity vector data from the preceding vehicle, in order to ensure that the value of the data from the inertial navigation device 34 of the preceding vehicle is within a predetermined tolerance range of the corresponding measured data. If the data is out of range, the DSP 38 transmits a warning signal to the driver of the following vehicle, who can in turn switch from automatic to manual control. In the interim, the feed-back control loop 44 continues controlling the throttle, brake and steering actuators of the following vehicle based on the data transmitted by the following vehicle's measurement system 16, and in turn maintains a safe following distance and substantially tracks the motion trajectory of the preceding vehicle.

One advantage of the system of the present invention, is that the feed-forward control loop permits the following vehicle to react to changes in speed and/or heading angle of the preceding vehicle substantially faster than if a feed-back control system only were employed. The system of the present invention thus effectively employs the velocity and other internal data transmitted by the preceding vehicle to rapidly compensate for any changes in such data, and substantially avoid oscillations in the distance maintained between the two vehicles. Yet another advantage of the invention, is that the system can continue controlling the vehicle in a degenerated mode if an error occurs in either the feed-forward or feed-back loop. This significantly increases system reliability.

What is claimed is:

1. An apparatus for controlling the longitudinal and lateral motion of a following vehicle to follow the path of a preceding vehicle, comprising:

first means for generating first signals indicative of a state vector comprising velocity and position vector components of the preceding vehicle, wherein each position vector component is derived by integrating the corresponding velocity vector component with respect to time;

second means for generating second signals indicative of a state vector comprising velocity and position vector components of the following vehicle, wherein each position vector component is derived by integrating the corresponding velocity vector component with respect to time; and third means for controlling the longitudinal and lateral motion of the following vehicle by generating a performance index based on an integration with respect to time of the differences between the state vector components of a first signal at a first time and the corresponding state vector components of a second signal at a second time following the first time controlling the speed and steering of the following vehicle such that the performance index is less than a predetermined value to cause the following vehicle to follow the path of the preceding vehicle.

2. An apparatus as defined in claim 1, wherein at least one of the first and second means includes an inertial navigation device mounted on the respective vehicle and generating velocity vector data indicative of the speed and direction of the respective vehicle.

3. An apparatus as defined in claim 1, wherein the third means controls the velocity of the following vehicle based also on the distance between the preceding and following vehicles.

4. An apparatus as defined in claim 1, further comprising fourth means mounted on at least one of the preceding and following vehicles for generating measurement data pertaining to the respective vehicle selected from the group including relative variable data, motion variable data, and internal variable data.

5. An apparatus as defined in claim 1, wherein the third means comprises a feed-forward control loop including means for performing longitudinal control of the following vehicle based on internal variable data and motion variable data from the preceding vehicle.

6. An apparatus as defined in claim 1, wherein the third means generates a quadratic performance index based on the differences between the corresponding state vector components of said first and second signals, and controls the longitudinal and lateral motion of the following vehicle so that the quadratic performance index is less than a predetermined value to thereby cause the following vehicle to follow the path of the preceding vehicle.

7. An apparatus as defined in claim 2, further comprising means for measuring the speed and the direction of the preceding vehicle, and means for comparing the measured data to corresponding data transmitted by the inertial navigation device of the preceding vehicle for performing fault diagnosis.

8. An apparatus as defined in claim 4, wherein the relative variable data is selected from the group including the distance between the preceding and following vehicles, and the relative speed of the preceding vehicle in comparison to the following vehicle.

9. An apparatus as defined in claim 4, wherein the motion variable data is selected from the group including the speed and direction of each vehicle.

10. An apparatus as defined in claim 4, wherein the internal variable data is selected from the group including the throttle position, brake position and steering position of the vehicle.

11. An apparatus as defined in claim 5, wherein the feed-forward control loop further includes means for performing lateral control of the following vehicle based on at least one of internal variable data and motion variable data from the preceding vehicle.

12. An apparatus as defined in claim 11, wherein the internal variable data is selected from the group including the throttle position, brake position and steering position of the preceding vehicle, and the motion variable data is selected from the group including the speed and direction of the preceding vehicle.

13. An apparatus as defined in claim 5, wherein the third means further comprises a feed-back control loop including means for performing longitudinal control of the following vehicle based on a speed measurement of the preceding vehicle relative to the following vehicle.

14. An apparatus as defined in claim 13, wherein the feed-back control loop includes means for performing lateral control of the following vehicle based on signals indicative of the steering position from the preceding vehicle.

15. A vehicle following system for controlling the longitudinal and lateral motion of a following vehicle to follow the path of a preceding vehicle, comprising:
 a first measurement system mounted on the preceding vehicle for generating first signals indicative of a state vector comprising velocity and position vector components of the preceding vehicle each position vector component being generated by integrating the respective velocity vector component with respect to time;
 a first communication system coupled to the first measurement system for transmitting the first signals;
 a second measurement system mounted on the following vehicle for generating second signals indicative of a state vector comprising velocity and position vector components of the following vehicle, each position vector component being generated by integrating the respective velocity vector component with respect to time;
 a second communication system mounted on the following vehicle for receiving the first signals transmitted by the first communication system; and
 a control unit coupled to the second measurement and communication systems, the control unit being responsive to the first and second signals to generate control signals for controlling the speed and steering of the following vehicle to follow the path of the preceding vehicle control signals being based on changes in a performance index generated by integrating with respect to time the difference between the velocity and position vector components of a first signal of the preceding vehicle at a first time and the corresponding velocity and position vector components of a second signal of the following vehicle at a second time following the first time.

16. An apparatus as defined in claim 15, wherein the second measurement system includes a ranging sensor generating signals indicative of the distance between the preceding and the following vehicles, and the control unit generates the control signals based also on the distance signals.

17. An apparatus as defined in claim 15, wherein the control unit includes a feed-back control loop and a feed-forward control loop, each control loop being responsive to control signals to perform lateral and longitudinal control of the following vehicle to maintain a substantially predetermined distance between the two vehicles and substantially follow the motion trajectory of the preceding vehicle.

18. An apparatus as defined in claim 15, wherein at least one of the first and second measurement systems includes a ranging sensor generating signals indicative of the distance between the two vehicles, and generating signals indicative of the speed of the respective vehicle relative to the other.

19. An apparatus as defined in claim 17, wherein the feed-forward control loop is responsive to internal variable data and motion variable data transmitted by the first communication system to perform longitudinal control of the following vehicle, and is responsive to at least one of internal variable data and motion variable data transmitted by the first communication system to perform lateral control of the following vehicle.

20. An apparatus as defined in claim 19, wherein the internal variable data is selected from the group including the throttle position, brake position and steering position of the preceding vehicle, and the motion variable data is selected from the group including the speed and direction of the preceding vehicle.

21. An apparatus as defined in claim 17, wherein the feed-back control loop is responsive to a relative speed measurement of the preceding and following vehicles relative to each other transmitted by the second measurement system to perform longitudinal control of the following vehicle.

22. An apparatus as defined in claim 17, wherein the feed-back control loop is responsive to signals transmitted by the first communication system indicative of the steering position of the preceding vehicle to perform lateral control of the following vehicle.

23. A system for controlling the longitudinal and lateral motion of a following vehicle to follow the path of a preceding vehicle, comprising:
 means for measuring state vector data of each vehicle, each state vector comprising velocity and position vector components of the respective vehicle, each position vector component being generated by integrating the respective velocity vector component with respect to time;
 means for communicating state vector data from the preceding vehicle to the following vehicle;
 means coupled to the measurement and communication means for estimating the motion trajectory of the preceding vehicle-based on a performance index generated by integrating with respect to time the differences between the velocity and position vector components of the state vector data of the preceding vehicle at a first time and the corresponding velocity and position vector components of the state vector data of the following vehicle at a second time following the first time; and
 means for controlling the longitudinal and lateral motion of the following vehicle such that the performance index is less than a predetermined value to cause the following vehicle to follow the path of the preceding vehicle.

24. A system as defined in claim 23, wherein
 the preceding vehicle comprises an inertial navigation device for generating velocity data comprising speed and directional components of the preceding vehicle, and
 the following vehicle includes means for measuring the velocity of the preceding vehicle, and means for performing fault diagnosis based on a comparison of the measured velocity and the velocity data from the inertial navigation device of the preceding vehicle.

25. A system as defined in claim 23, wherein the means for controlling includes a feed-forward control loop for performing lateral and longitudinal control the following vehicle based on state-vector data transmitted by the communication means.

26. A system as defined in claim 25, wherein the means for controlling further includes a feed-back control loop for performing lateral and longitudinal control of the following vehicle based on state-vector data measured on the following vehicle.

* * * * *

UNITED STATES PATENT AND TRADEMARK OFFICE
CERTIFICATE OF CORRECTION

PATENT NO. : 5,572,449
DATED : November 5, 1996
INVENTOR(S) : Tang et al.

It is certified that error appears in the above-indentified patent and that said Letters Patent is hereby corrected as shown below:

Claim 1

Column 9, line 66, insert --, and by-- before "controlling".

Claim 15

Column 11, line 29, insert --, the-- after "vehicle".

Column 11, line 32, delete "difference" and insert --differences--.

Claim 23

Column 12, line 30, delete "vehicle-based" and insert --vehicle based--.

Signed and Sealed this

Fourth Day of March, 1997

Attest:

BRUCE LEHMAN

Attesting Officer

Commissioner of Patents and Trademarks